(12) United States Patent
Migliorini et al.

(10) Patent No.: US 6,863,964 B2
(45) Date of Patent: Mar. 8, 2005

(54) METALLIZED MULTILAYER FILM

(75) Inventors: Robert A. Migliorini, North Haven, CT (US); Salvatore James Pellingra, Wolcott, NY (US); Karen A. Sheppard, Victor, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 105 days.

(21) Appl. No.: 10/267,454

(22) Filed: Oct. 9, 2002

(65) Prior Publication Data

US 2004/0072004 A1 Apr. 15, 2004

(51) Int. Cl.$^7$ .............................. B32B 15/08; H05H 1/24
(52) U.S. Cl. ....................... 428/213; 428/215; 428/458; 428/461; 428/516; 428/910; 427/569; 427/576
(58) Field of Search ................................ 428/213, 215, 428/910, 461, 458, 516; 427/569, 576

(56) References Cited

U.S. PATENT DOCUMENTS

| | | | |
|---|---|---|---|
| 3,480,530 A | 11/1969 | Joyner et al. | 205/641 |
| 5,063,264 A | 11/1991 | Nakajima | 524/118 |
| 5,153,074 A | 10/1992 | Migliorini | 428/463 |
| 5,194,318 A | 3/1993 | Migliorini et al. | 428/215 |
| 5,254,394 A * | 10/1993 | Bothe et al. | 428/212 |
| 5,527,608 A * | 6/1996 | Kemp-Patchett et al. | 428/349 |
| 5,591,520 A | 1/1997 | Migliorini et al. | 428/347 |
| 5,667,902 A | 9/1997 | Brew et al. | 428/518 |
| 5,753,363 A | 5/1998 | Bader et al. | 428/331 |
| 5,840,419 A | 11/1998 | Alder | 428/327 |
| 5,888,640 A | 3/1999 | Marotta et al. | 428/308.4 |
| 6,086,982 A | 7/2000 | Peiffer et al. | 428/213 |
| 6,391,425 B1 * | 5/2002 | Migliorini et al. | 428/172 |

FOREIGN PATENT DOCUMENTS

| | | |
|---|---|---|
| EP | 444 340 A1 | 9/1991 |
| EP | 539 026 A1 | 4/1993 |
| EP | 545 812 A1 | 6/1993 |

OTHER PUBLICATIONS

J. L. Koenig et al., "Integrated Infrared Band Intensity Measurement of Stereoregularity in Polypropylene", *Journal of Applied Polymer Science*, vol. 9, pp. 359–367, (1965).

* cited by examiner

Primary Examiner—Monique R. Jackson
(74) Attorney, Agent, or Firm—Rick F. James

(57) ABSTRACT

A metallized, multilayer film suitable for packaging applications is provided which comprises a first skin layer comprising a thermoplastic selected from the group consisting of high density polyethylene, ethylene vinyl alcohol copolymer, medium density polyethylene, linear low density polyethylene, ethylene-propylene-butylene terpolymer, propylene-butylene copolymer, and amorphous polyamide, a metallized layer adjacent to the first skin layer, and a core layer comprising high crystallinity polypropylene homopolymer with an intermolecular stereoregularity greater than 93%. Additionally, low density polyethylene, EMA, EVA, or EAA may be extrusion laminated to the metallized side of the metallized, multilayer film at a web tension sufficient to prevent metal crazing of the vacuum deposited aluminum layer. A method for making the film is also provided.

36 Claims, 2 Drawing Sheets

METALLIZED MULTILAYER FILM

FIELD OF THE INVENTION

This invention relates to the field of metallized polymer films. It more particularly relates to a metallized multilayer film having improved metal craze resistance. More particularly, the present invention relates to metallized oriented polypropylene having a core layer comprised of high crystallinity polypropylene homopolymer.

BACKGROUND OF THE INVENTION

In the packaging of certain types of foods, such as snack foods including candies, potato chips, cookies and the like, it is common practice to employ a multilayer film. Polypropylene films are widely used in the packaging industry due to their superior physical properties, such as, transparency, stiffness, moisture barrier characteristics and others. Despite these highly desirable properties, unmodified polypropylene film has the disadvantageous property of having a high inherent coefficient of friction and film-to-film destructive blocking on storage. This high film-to-film coefficient of friction makes polypropylene films difficult to be successfully employed in automatic packaging equipment in their unmodified form.

The bonding of metals, such as, aluminum, silver, chromium, etc., to plastic films and the gas barrier developed, has allowed such films to replace metallic foils in many instances. The flexibility of the films necessitates the formation of a strong metal/plastic bond and a number of approaches have been developed for providing such bonding. In some cases a special primer layer must be applied to the base layer in order to achieve an effective bond between the metal and the substrate. In many cases a thermoplastic surface must be corona discharged treated to provide an effective bond between the metal and the thermoplastic surface. Gas barrier properties will also depend upon the condition of the surface on which the metal is deposited.

Metallized oriented polypropylene (OPP) provides for an improvement in aesthetics due to the rich metal-like appearance of the package. Metallized OPP is formed by vacuum depositing a thin layer (100–600 Å thick) of aluminum onto the surface of a clear OPP base film substrate. The layer of aluminum that is deposited is particularly sensitive to damage such a scratching, pin-holing, pickoff, and metal crazing. Metal crazing occurs during extrusion lamination when the hot polyolefin from the die hits the aluminum surface of the metallized film causing it to crack in the cross machine direction. These cross machine direction cracks in the metal result in unacceptable aesthetics and, more importantly, adversely affect barrier properties. The cracks in the metal make it much easier for light, water vapor, oxygen and other gases to diffuse through the metallized film which results in poorer values for optical density, water vapor transmission rate (WVTR), and oxygen transmission rate (OTR). Metal crazing is also much more prevalent when the metallized film is run off the primary unwind of the extrusion laminator because of being subjected to more severe conditions compared to the secondary unwind. When the metallized film is run off the primary unwind, it typically has a longer web path prior to the laminating point and is also not against a chill roll at the point the polymer strikes the surface of the metal layer. Because the metallized film is not directly against a chill roll, there is a greater heat load on the film that results in a greater propensity for metal crazing. When run off the primary unwind, the metallized film is backed by a rubber coated nip roll at the lamination point. On the other hand, when the metallized film is run off a secondary unwind of an extrusion laminator, the web path is typically much shorter and the metallized film is backed by a large diameter water cooled chill drum when it is subjected to the hot melt. This results in much less of a tendency for metal crazing. Unfortunately, converters cannot always run the metallized film off the secondary unwind of the extrusion laminator, resulting in a metal crazed lamination unfit for commercial use.

U.S. Pat. No. 5,153,074 to Migliorini discloses a metallized film combination which includes a polymer substrate with an ethylene vinyl alcohol copolymer skin layer and a thin metal layer deposited on the surface of the ethylene vinyl alcohol copolymer. A maleic anhydride modified propylene homopolymer or copolymer is provided for adequate adhesion of the ethylene vinyl alcohol copolymer skin layer to the polymer substrate. The resulting metallized film exhibits outstanding resistance to the transmission of oxygen and other gases. U.S. Pat. No. 5,153,074 is incorporated herein by reference in its entirety.

U.S. Pat. No. 5,194,318 to Migliorini et al. discloses a metallized oriented film combination which includes a propylene polymer substrate with a high density polyethylene skin layer and a thin metal layer deposited on the surface of the high density polyethylene. The resulting metallized film exhibits outstanding metal adhesion to the polymeric substrate and good barrier properties to moisture and oxygen. U.S. Pat. No. 5,194,318 is incorporated herein by reference in its entirety.

U.S. Pat. No. 5,591,520 to Migliorini et al. discloses a metallized film combination which includes a propylene substrate with an amorphous polyamide skin layer and a thin metal layer deposited on the surface of the amorphous polyamide skin layer. A maleic anhydride modified propylene homopolymer or copolymer is provided for adhering the amorphous polyamide skin layer to the polymer substrate. The resulting metallized film exhibits outstanding resistance to the transmission of oxygen and other gases. U.S. Pat. No. 5,591,520 is incorporated herein by reference in its entirety.

U.S. Pat. No. 5,753,363 to Bader et al. discloses a metallized film structure which includes an olefin substrate with a sealable skin layer comprising a propylene co- or terpolymer and a non-migratory particulate crosslinked hydrocarbyl substituted polysiloxane. The resulting metallized film exhibits low coefficient of friction and good machinability on packaging equipment. U.S. Pat. No. 5,753,363 is incorporated herein by reference in its entirety.

U.S. Pat. No. 6,086,982 to Peiffer et al. teaches a biaxially oriented polypropylene film of increased dimensional stability (shrinkage in the longitudinal direction and in the transverse direction of less than 5%). The film comprises a base ply having n-heptane-insoluble content of the film having a chain isotactic index of at least 97%. Such polypropylenes are made using metallocene catalysts. U.S. Pat. No. 6,086,982 is incorporated herein by reference in its entirety.

Objects and advantages of the present invention include one or more of the following:
To provide a metallized, multilayer polypropylene film having improved craze resistance in lamination applications.
To provide a metallized, multilayer polypropylene film having improved moisture and oxygen barrier after lamination.
To provide a metallized, white opaque multilayer polypropylene film having improved craze resistance in lamination applications.

To provide a metallized, white opaque multilayer polypropylene film having improved moisture and oxygen barrier after lamination.

To provide a metallized, multilayer polypropylene film that is more robust to laminating conditions, and in particular tensions, pressures and temperatures.

To provide a metallized film lamination including an extrusion laminated olefin layer adjacent to the metal layer that is free from metal crazing.

To provide a metallized film lamination including an extrusion laminated olefin layer adjacent to the metal layer that has improved moisture and oxygen barrier.

To provide a metallized white opaque film lamination including an extrusion laminated olefin layer adjacent to the metal layer that is free from metal crazing.

To provide a metallized white opaque film lamination including an extrusion laminated olefin layer adjacent to the metal layer that has improved moisture and oxygen barrier.

To provide a heat sealable, metallized, multilayer polypropylene film having outstanding machinability and sealability on high speed packaging lines.

To provide a heat sealable, metallized white opaque multilayer polypropylene film having outstanding machinability and sealability on high speed packaging lines.

This invention provides metallized multi-layer film having the above-mentioned desirable properties. This metallized multi-layer film comprises a core layer comprising high crystallinity polypropylene.

SUMMARY OF THE INVENTION

Inventive aspects of this invention include metallized multi-layer polypropylene films with improved metal craze resistance in lamination applications. The present invention seeks to reduce or eliminate metal crazing by using a unique core composition in the metallized film. Typically, the core composition is of a high crystallinity PP (HCPP) resin or a blend of HCPP and standard PP resin. Surprisingly, the metal craze resistance of a metallized polypropylene film in lamination applications is significantly improved when the base polymer used in the film comprises a highly crystalline polypropylene homopolymer.

In one aspect, the present invention relates to a metallized multilayer film comprising: (a) a core layer comprising high crystallinity polypropylene homopolymer with an intermolecular stereoregularity greater than 93%; (b) a first skin layer adjacent to said core layer wherein said skin layer comprises a thermoplastic selected from the group consisting of high density polyethylene, ethylene vinyl alcohol copolymer, medium density polyethylene, linear low density polyethylene, ethylene-propylene random copolymer, ethylene-propylene-butylene terpolymer, propylene-butylene copolymer, and amorphous polyamide; and (c) a metallized layer adjacent to said first skin layer. Typically, the high crystallinity polypropylene homopolymer is a product of Ziegler-Natta catalysis. Such Ziegler-Natta catalysis-produced high crystallinity polypropylene homopolymer provides a metallized multilayer film, wherein the shrinkage of said film in the longitudinal direction and in the transverse direction is greater than 5%, as measured by DIN 404 34.

In a particular embodiment of this aspect of the invention, the metallized multilayer film further comprises a second skin layer adjacent to the core layer and on a side of the core layer opposite the first skin layer, the second skin layer comprising a polyolefin selected from the group consisting of ethylene-propylene random copolymer, ethylene-propylene-butylene terpolymer, propylene-butylene copolymer, and ethylene.

In another embodiment of this aspect of the invention, the core layer of the metallized multilayer film further comprises an additive selected from the group consisting of: i) an opacifying agent selected from the group consisting of iron oxide, carbon black, aluminum, $TiO_2$, and talc, said opacifying agent being present in said core layer in an amount ranging from about 1 wt % to about 15 wt %, based on the total weight of the core layer; ii) a cavitating agent selected from the group consisting of polybutene terephthalate, nylon, solid glass spheres, hollow glass spheres, metal beads, metal spheres, ceramic spheres, and $CaCO_3$, said cavitating agent being present in said core layer in an amount ranging from about 1 wt % to about 20 wt %, based on the total weight of the core layer, said cavitating agent having a mean particle size in the range of from 0.1 micron to 10 microns; and iii) a hydrocarbon resin, said resin being one of petroleum resin, terpene resin, styrene resin, cyclopentadiene resin, saturated alicyclic resin, or combinations thereof, said resin having a number average molecular weight <5000, and a softening point ranging from about 60° C. to about 180° C., said resin being present in said core layer at <10 weight percent.

In another aspect, the present invention relates to a metallized multilayer film comprising:
1) a first component comprising: (a) a core layer comprising a high crystallinity polypropylene homopolymer with an intermolecular stereoregularity greater than 93%; (b) a first skin layer adjacent to said core layer wherein said skin layer comprises high density polyethylene; (c) a vacuum deposited aluminum layer adjacent to said first skin layer; and
2) a second component comprising a polymer selected from at least one of low density polyethylene, EVA, EMA and EAA that is extrusion laminated to said aluminum layer of said first component at a web tension sufficient to prevent metal crazing of said vacuum deposited aluminum layer. Typically, the high crystallinity polypropylene homopolymer is a product of Ziegler-Natta catalysis.

In one embodiment of this aspect of the invention, the shrinkage of the film in the longitudinal direction and in the transverse direction is greater than 5%, as measured by DIN 404 34.

In another embodiment of this aspect of the invention, the web tension is typically up to 1 pound per linear inch on the metallized multilayer film during the extrusion lamination.

In still another aspect the present invention relates to a metallized multilayer film comprising:
1) a first component comprising:
   (a) a core layer comprising a high crystallinity polypropylene homopolymer with an intermolecular stereoregularity greater than 93%;
   (b) a first skin layer adjacent to said core layer wherein said skin layer comprises a thermoplastic selected from a group consisting of ethylene vinyl alcohol copolymer, and amorphous polyamide;
   (c) a tie layer adjacent to said first skin layer comprising maleic anhydride modified polypropylene homopolymer or copolymer;
   (d) a vacuum deposited aluminum layer adjacent to said first tie layer layer; and
2) a second component comprising a polymer selected from at least one of low density polyethylene, EVA, EMA and EAA that is extrusion laminated to said aluminum layer of said first component at a web tension sufficient to prevent metal crazing of said vacuum deposited aluminum layer.

In still another aspect, the present invention relates to a metallized multilayer film comprising:

(a) a core layer comprising a high crystallinity polypropylene homopolymer with an intermolecular stereoregularity greater than 93%;
(b) a first skin layer adjacent to said core layer wherein said skin layer comprises a thermoplastic selected from a group consisting of ethylene vinyl alcohol copolymer, and amorphous polyamide;
(c) a tie layer adjacent to said first skin layer comprising maleic anhydride modified polypropylene homopolymer or copolymer;
(d) a vacuum deposited aluminum layer adjacent to said first tie layer layer; and
(e) a second skin layer adjacent to said core layer and on a side of said core layer opposite said first skin layer, said second skin layer comprising a polyolefin selected from the group consisting of ethylene-propylene random copolymer, ethylene-propylene-butylene terpolymer, propylene-butylene copolymer, and ethylene-propylene impact copolymer.

In still another aspect, the present invention relates to a multilayer metallized film comprising a core layer having a high crystallinity polypropylene homopolymer with an intermolecular stereoregularity greater than 93%, a first skin layer adjacent to the core layer wherein the skin layer is comprised of a thermoplastic selected from a group consisting of ethylene vinyl alcohol copolymer, and amorphous polyamide and a vacuum deposited metallized layer adjacent to the first skin layer.

In yet another aspect, the present invention relates to a method of making a metallized biaxially oriented multilayer film comprising the steps of:
(a) coextruding a multilayer melt of thermoplastic polymers including a core layer comprising a high crystallinity polypropylene homopolymer with an intermolecular stereoregularity greater than 93% through a die;
(b) cooling said multilayer melt to form a multilayer sheet;
(c) stretching said multilayer sheet in the machine direction (MD) over a series of heated rollers traveling at a differential speed to form an MD oriented multilayer film;
(d) stretching said MD oriented multilayer film in a heated tenter frame to form a biaxially oriented multilayer film;
(e) surface treating at least one of said first skin layer and said second skin layer of said biaxially oriented multilayer film with a treatment selected from the group consisting of corona treatment, flame treatment and plasma treatment; and
(f) metallizing said first skin layer in a vacuum metallizer with aluminum to form a metallized biaxially oriented multilayer film.

In one embodiment of this aspect, the method of the invention further comprises an additional step of extrusion laminating at least one of low density polyethylene, EMA, EVA, and EAA to the metallized side of said film at a web tension sufficient to prevent metal crazing of the vacuum metallized aluminum layer.

BRIEF DESCRIPTION OF THE DRAWINGS

FIG. 1 depicts a schematic of a cross-section of the metallized multilayer film for an embodiment of the present invention.

FIG. 2 depicts a schematic of a cross-section of the metallized multilayer film for an embodiment of the present invention, employing a tie layer between the core layer and a skin layer.

DETAILED DESCRIPTION OF THE INVENTION

Figure 1:
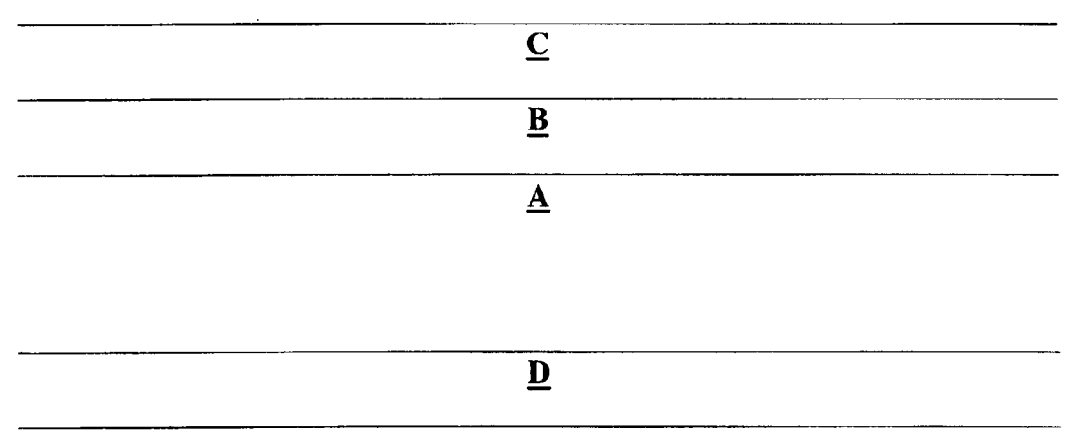
Figure 2:
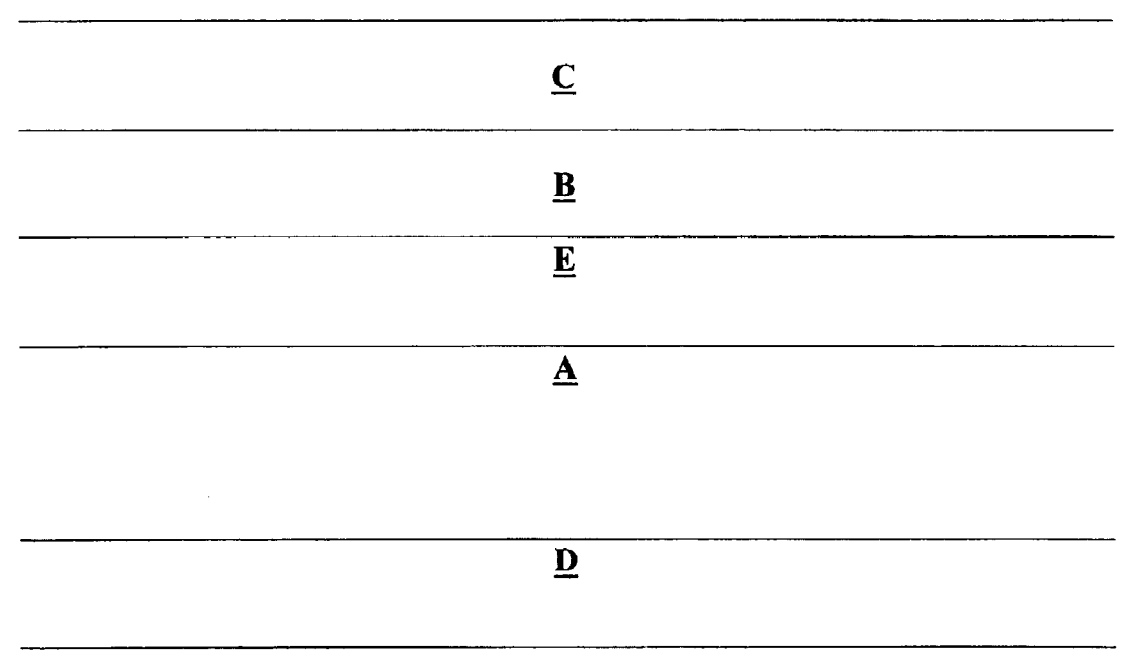

FIG. 1 depicts a cross-section of metallized oriented polypropylene film of an embodiment of the present invention. In its most simple form, there is a core layer A, a skin layer B thereon, and a metallized layer C deposited on top of the skin layer B. An optional second skin layer D, may also be included. Additionally, an optional tie layer E may be interposed between skin layer B and core layer A as depicted in FIG. 2.

Core Layer A

In one form, the core layer A comprises a HCPP homopolymer or blend of HCPP and standard PP homopolymer. Optionally, there may also be added a natural or synthetic resin, such as a synthetic or natural hydrocarbon/terpene resin modifier to help improve the stiffness and the crystallinity of the core to enhance the metal craze resistance of the metallized film. The core layer A therefore comprises a high crystallinity polypropylene homopolymer with a stereoregularity greater than 93%, and may be blended with a standard PP homopolymer. The core layer A ranges from about 10 to about 48 microns in thickness. Optionally, there may also be added a cavitating agent to the core layer A to form a white opaque metallized film structure.

A blend of HCPP and standard PP homopolymer preferably includes an amount of HCPP effective to provide the metallized film with improved craze resistance.

The core layer preferably includes from about 50% to about 100% by weight of HCPP and, more preferably, from about 65% to about 100% by weight of HCPP. The remaining percentage of the core layer A is formed of standard PP homopolymer. Optionally, the core layer A includes from about 1% to about 10% by weight of a natural or synthetic hydrocarbon resin, and more preferably, from about 3% to about 8% by weight.

The HCPP has a high isotactic stereoregularity, resulting in higher crystallinity than conventional isotactic polypropylene, i.e., greater than about 93%. For present purposes, Standard isotactic polypropylene is defined herein as having an isotactic stereoregularity of from about 85% to about 93%. HCPP resin is defined as one with a xylene soluble level of 2% or less, and preferably 1.5% or less. The range of acceptable melt flow rates is 1.0 to 5.9, and preferably 1.8 to 4.0. The HCPP thus exhibits higher stiffness, surface hardness, lower deflection at higher temperatures and better creep properties than conventional isotactic polypropylene. Further information relating to HCPP, including methods for preparation thereof, is disclosed in U.S. Pat. No. 5,063,264, incorporated herein by reference.

In addition to these properties, the HCPP-containing multilayer films of the present invention exhibit shrinkage values in the longitudinal direction and in the transverse direction that are greater than 5%, and preferably greater than 6%. The following method of measurement is typically used for characterizing the raw materials and the films:

Shrinkage

The longitudinal and transverse shrinkage values relate to the respective increase in dimensions of the film (longitudinal $L_0$ and transverse $Q_0$) before the shrinking process. The longitudinal direction is the machine direction, and the transverse direction is defined correspondingly as the direction transverse to the machine run. The test specimen is subjected to a temperature of 135° C. for 7 minutes in a circulating-air oven. After the test specimen has cooled completely, the decreases in dimensions in the longitudinal and transverse directions are subsequently redetermined ($L_1$ and $Q_1$). The shrinkage is then given as the difference between the decrease in dimensions determined compared with the original dimension $L_0$ and $Q_0$.

Longitudinal shrinkage $L_s=(L_0-L_1)/L_0$

Transverse shrinkage $Q_s=(Q_0-Q_1)/Q_0$

This determination method for longitudinal and transverse shrinkage corresponds to DIN 404 34.

Commercially available HCPP suited to use in the present invention includes Amoco 9218X from BP Amoco Chemical Company, and Adstif® 699 from Montell Chemical Company.

For purposes of the present invention, stereoregularity can be determined by IR spectroscopy according to the procedure set out in "Integrated Infrared Band Intensity Measurement of Stereoregularity in Polypropylene," J. L. Koenig and A. Van Roggen, Journal of Applied Polymer Science, Vol. 9, pp. 359–367 (1965) and in "Chemical Microstructure of Polymer Chains," Jack L. Koenig, Wiley-Interscience Publication, John Wiley and Sons, New York, Chichester, Brisbane, Toronto. Stereoregularity can also be determined by decahydronaphthalene (decalin) solubility and nuclear magnetic resonance spectroscopy (NMR).

The standard PP homopolymer may have an isotacticity of between 85% to 93%, and preferably between 90% and 93% as measured by $C_{13}$ NMR. The standard isotactic polypropylene polymer may have a melt flow (measured in accordance with the standard ASTM D1238 method) ranging from about 1.2 to about 10 g/10 minutes, and preferably from about 2.5 to about 6 g/10 minutes. Ziegler-Natta catalyzed polypropylenes are preferred to metallocene catalyzed polypropylenes due to the broader molecular weight distribution and low isotacticity levels achievable.

Commercially available standard isotactic polypropylene homopolymer suited to use in the present invention includes Fina 3371 from Fina Oil and Chemical Company, Chemical Division, Dallas Tex.

Examples of natural and synthetic hydrocarbon resins, which may be used in the core layer A, are described in U.S. Pat. No. 5,667,902. The resin modifier may, optionally, be hydrogenated. The resin modifier may have a number average molecular weight less than about 5000, for example, less than about 2000, for example, from about 500 to 1000. The resin modifier can be natural or synthetic and may have a softening point of from about 60° C. to about 180° C. Particular hydrocarbon resins include among others petroleum resins, terpene resins, styrene resins and cyclopentadiene resins.

Examples of commercially available hydrogenated hydrocarbon resins are those sold under the trademarks PICCOLYTE, REGALREZ and REGALITE by Hercules Corporation of Delaware and under the trademark ESCOREZ by ExxonMobil Chemical Company of Houston, Tex.

One particular resin modifier is referred to herein as a saturated alicyclic resin. The saturated alicyclic resins are obtained by the hydrogenation of aromatic hydrocarbon resins. The aromatic resins are themselves obtained by polymerizing reactive unsaturated hydrocarbons containing, as the principal component, aromatic hydrocarbons in which the reactive double bonds are generally in side-chains. More particularly, the alicyclic resins are obtained from the aromatic resins by hydrogenating the latter until all, or almost all, of the unsaturation has disappeared, including the double bonds in the aromatic rings.

The saturated alicyclic resins used in the present invention may have a softening point from about 85° C. to about 140° C. for example, from about 100° C. to about 140° C., as measured by the ball and ring method. Examples of commercially available saturated alicyclic resins are those sold under the trademark ARKON-P by Arakawa Forest Chemical Industries, Ltd. of Japan.

Optionally, the core layer A may contain microscopic voids and/or 1–15, or 1–8, or 2–4 weight % of an opacifying agent, selected from one of iron oxide, carbon black, aluminum, $TiO_2$, talc, or combinations thereof.

Void-initiating particles, which may be added as filler to the polymer matrix material of the core layer, can be any suitable organic or inorganic material which is incompatible with the core material at the temperature of biaxial orientation, such as polybutene terephthalate (PBT), nylon, solid or hollow preformed glass spheres, metal beads or spheres, ceramic spheres, calcium carbonate, or combinations thereof.

The average diameter of the void-initiating particles may be from 0.1 to 10 microns. These particles may be of any desired shape or they may be substantially spherical in shape. This does not mean that every void is the same size. It means generally each void tends to be of like shape when like particles are used even though they vary in dimensions. These voids may assume a shape defined by two opposed and edge contacting concave disks. These void initiating particles will be present in the core layer at $\leq 20$ weight percent, or $\leq 15$ weight percent, or $\leq 10$ weight percent, typically in the range of from 1–10 weight percent, based on the total weight of the core layer. The two average major void dimensions are greater than 30 microns. The void-initiating particle material, as indicated above, may be incompatible with the core material, at least at the temperature of biaxial orientation.

The core layer A has been described above as being a thermoplastic polymer matrix material within which is located a strata of voids. The voids create the matrix configuration. The term "strata" is intended to convey that there are many voids creating the matrix and the voids themselves may be oriented so that the two major dimensions are aligned in correspondence with the direction of orientation of the polymeric film structure. As described herein above, iron oxide in an amount of from 1–8 wt. %, preferably 2–4 wt. % and aluminum in an amount of from 0–1.0 wt. %, preferably 0.25 wt. %–0.85 wt. % are added to the core matrix. Carbon black may also be used in lieu of some or all of the iron oxide.

A typical void of the core is defined as having major dimensions X and Y and minor dimensions Z, where dimension X is aligned with machine direction orientation, dimension Y is aligned with transverse direction orientation and dimension Z approximately corresponds to the cross-sectional dimension of the spherical particle which initiated the void.

Orientation conditions may be such that the X and Y dimensions of the voids of the core by major dimensions in comparison to the Z dimension. Thus, while the Z dimension generally approximates the cross-sectional dimension of the spherical particle initiating the void, X and Y dimensions may be significantly greater.

Polypropylene may be oriented at a temperature higher than its glass transition temperature. The temperature conditions may permit X and Y to be at least several multiples of the Z dimension, without void splitting. As indicated above, the matrix polymer and the void initiating particle may be incompatible and this term is used in the sense that the materials are two distinct phases. The spherical void initiating particles constitute a dispersed phase throughout the lower melting polymer which polymer will, ultimately, upon orientation, become a void-filled matrix with the spherical particles positioned somewhere in the voids.

The core layer typically ranges from about 10 microns to about 48 microns in thickness, preferably ranging from about 13_microns to about 33_microns.

Skin Layer B

The skin layer B may comprise at least one of surface treated high density polyethylene (HDPE), medium density polyethylene (MDPE), linear low density polyethylene (LLDPE), ethylene propylene (EP) random copolymer, ethylene propylene butylene (EPB) terpolymer, propylene butylene (PB) copolymer, treated or untreated ethyl vinyl alcohol (EVOH) copolymer and amorphous polyamide. In one form, surface treated HDPE is used. Heat sealable blends can be utilized in the skin layer B. Therefore, along with the copolymer or terpolymer there can be polypropylene homopolymer, e.g. one which is the same as, or different from, the polypropylene homopolymer constituting core layer A. Typically, prior to metallization, the surface of skin layer B is treated to improve metal adhesion by corona, plasma, or flame treatment.

The skin layer B polyethylene may be a linear low density polyethylene (LLDPE), a linear high density polyethylene (HDPE) or medium density polyethylene (MDPE). These polymers may have a melt index of 1 to 10, and preferably from about 3 to 6. LLDPE may be polymerized using a metallocene-based catalyst system. The medium density polyethylene may have a density of 0.92 to 0.94 while the linear low density polyethylenes may have a density in the range 0.90–0.94, e.g., 0.918 to 0.921. The linear low density polyethylenes may be derived from ethylene together with other higher comonomers such as hexene-1 or octene-1. The linear high density polyethylene (HDPE) may have a density as high as about 0.97, usually ranging from about 0.940 to about 0.97, e.g., ranging from about 0.955 to about 0.965.

EP random copolymers which can be used for the skin layer B of the present film are ethylene-propylene random copolymers containing from about 0.2 to about 6%, and preferably from about 0.5 to about 3% ethylene.

EPB terpolymers which can be used for skin layer B of the present film are ethylene-propylene-butene terpolymers containing from about 0.5 to about 6, and preferably from about 1 to about 3 weight percent ethylene and from about 1 to 6, and preferably from about 2 to about 4 weight percent butene-1.

PB copolymers which can be used for skin layer B of the present film are propylene-butene-1 copolymers containing from about 2 to about 10 weight percent butene-1, and preferably from about 3 to 6 percent by weight butene-1. The EP and PB copolymers, and EPB terpolymers of skin layer B may have a melt flow rate in the range of about 4 to 10 with a density of about 0.9 and a melting point of greater than 130° C., preferably greater than 140° C., and for example, in the range of about 142° C. to about 156° C.

EVOH copolymers suitable for skin layer B of the present film can have an ethylene content ranging from 30 to about 50% by weight with a melt index of 1 to 10, and preferably from 3 to about 6.

Amorphous polyamides are described as those polyamides which are lacking in crystallinity as shown by the lack of endotherm crystalline melting peak via Differential Scanning Calorimeter measurement. Specific examples of amorphous polyamides which are suitable for skin layer B of the present film include: hexamethylenediamine isophthalamide, hexamethylenediamine isophthalamide/terephthalamide terpolymer, having iso/terephthalic moiety ratios of 100/0 to 60/40, mixtures of 2,2,4- and 2,4,4-trimethylhexamethylenediamine terephthalamide, copolymers of hexamethylene diamine and 2-methylpentamethylenediamine with iso- or terephthalic acids, or mixtures of these acids. Polyamides based on hexamethylenediamine iso/terephthalamide containing high levels of terephthalic acid moiety may also be useful provided a second diamine such as 2-methyldiaminopentane is incorporated to produce a processable amorphous polymer. The amorphous polyamide of the present invention can be optionally blended with at least one semicrystalline polyamide.

Skin layer B may also be also optionally made from blends of one or more of the polyolefins described above for skin layer B.

Skin layer B will have a thickness in the range of from about 0.2 micron to about 2.0 microns, say, from about 0.5 micron to about 2.0 microns, e.g., from about 0.5 micron to about 1 micron.

Metallized Layer C

The metallized layer C is preferably vacuum deposited. In one form the metal is aluminum and has an optical density of about 1.5 to about 3.0. Typically, the metal layer is applied to an optical density of about 1.5 to about 5.0, and more particularly from about 2.0 to about 3.0. Usually vacuum deposition is the method of choice. While aluminum is a contemplated metal, other metals, e.g. zinc, gold, silver, etc. which are capable of being vacuum deposited to the surface of the film can also be employed. A low density polyethylene may be extrusion laminated to the aluminum layer at web-tensions sufficient to prevent metal crazing. The web tensions may range from about 0.1 to about 3.0 pounds per linear inch, preferably from about 0.25 to about 1.5 pounds per linear inch, for example, 1 pound per linear inch. The low density polyethylene may optionally include ethylene vinyl acetate (EVA), ethylene methyl acrylate (EMA), and/or ethylene ethyl acrylate (EEA) copolymer to improve adhesion between the LDPE and the metallized layer C.

Second Skin Layer D

The second skin layer D is adjacent to the core layer A on a side opposite that of the skin layer B. The second skin layer D typically comprises a polyolefin selected from the group consisting of a heat sealable EP random copolymer, EPB terpolymer and PB copolymer or a surface treated EP impact copolymer, for example, an untreated broad seal range EPB terpolymer, ranging from about 0.5 micron to about 8.0 microns thick. The heat sealable polymer can be any layer or coating which will permit the film to be heat sealed to itself or heat sealed to some other surface.

EP random copolymers which can be used for the second skin layer D of the present film are ethylene-propylene random copolymers containing from about 1.5 to about 10, and preferably from about 3 to about 7 weight percent ethylene.

EPB terpolymers which can be used for the second skin layer D of the present film are ethylene-propylene-butene terpolymers containing from about 1 to about 10, and preferably from about 2 to about 6 weight percent ethylene, and from about 2 to about 20, and preferably from about 4 to about 15 weight percent butene-1.

PB copolymers which can be used for the second skin layer D of the present film are propylene-butene-1 copolymers containing from about 5 to about 20 weight percent butene-1, and preferably from about 7 to 15 percent by weight butene-1. The EP and PB copolymers, and EPB terpolymers of second skin layer D may have a melt flow rate in the range of about 3 to 10 with a density of about 0.9 and a melting point or less than 140° C., for example, in the range of about 110° C. or less to about 140° C.

The second skin layer D may be formed from a mixture of the aforementioned heat sealable polyolefins for the second skin layer D.

The second skin layer D may also be formed from a non-heat sealable polyolefin and more particularly EP impact or block copolymers with ethylene contents from about 10% to about 40% by weight.

The second skin layer D will have a thickness in the range of from about 1 micron to about 8 microns, preferably from about 1.5 microns to about 4 microns.

To optionally treat the second skin layer, flame, corona or plasma treatment methods are contemplated prior to metallization.

Skin Layer Additives

Either or both of skin layers B and D may include one or more antiblock agents. These antiblock agents include inorganic particles, such as clays, talc, glass, and others. One antiblock material can be used alone, or different sizes and shapes can be blended to optimize machinability. The major proportion of the particles, for example, more than half, may be of such a size that a significant portion of their surface area, will extend beyond the exposed surface of such skin layer. Suitable antiblocks include, but are not limited to, fully cross-linked non-meltable polymethyl methacrylate (PMMA) particles, such as EPOSTAR® MA-1002, or silica ($SiO_2$) particles, such as SYLOBLOC 44 from W. R. Grace, or fully cross-linked or non-meltable polysiloxane microspheres, such as TOSPEARL T120A, from Toshiba Silicone Company, Ltd. Partially cross-linked polysiloxane particles, which release non-cross-linked liquid silicone under stress, as described in U.S. Pat. No. 5,840,419, can also be used. The solid antiblock may be incorporated into the skin layer in an amount ranging from about 0.1 to about 0.5% by weight, preferably from about 0.15 to about 0.30% by weight, based on the entire weight of the skin layer.

Tie Layer E

The total film thickness, as shown in the FIG. 1, should range from about 12 microns to about 50 microns, preferably from about 15 microns to about 35 microns. The addition of extra layers will, of course, increase this thickness. One such layer contemplated by the present invention is shown in FIG. 2. The embodiment shown here has a tie layer E between the core A and the skin B layers. The tie layer E comprises at least one of maleic anhydride grafted polyolefin, EP impact or block copolymer, conventional PP homopolymer, HCPP homopolymer, and HCPP-conventional PP homopolymer blends containing additives such as $TiO_2$ and large particle size antiblock. For example, the tie layer comprises at least one of maleic anhydride modified polypropylene homopolymer and maleic anhydride modified polypropylene copolymer which are necessary when the skin layer B is EVOH copolymer or amorphous polyamide to achieve adequate adhesion between these skin layer B polymers and the core layer A. By a "maleic anhydride modified polypropylene homopolymer or copolymer" is meant the product resulting from the reaction between maleic anhydride and the thermal degradation product of polypropylene or polypropylene copolymer. Examples of this material can be found disclosed in U.S. Pat. No. 3,480,580, the disclosure of which is incorporated herein by reference in its entirety. Particular attention is directed to examples 3–4, and 6 of the specification. The tie layer E will have a thickness in the range of from about 1 to about 5 microns, preferably from about 2 to about 4 microns.

Method of Making Film

One method of making the above-described metallized biaxially oriented multilayer film comprises coextruding a multilayer melt of thermoplastic polymers through a die, then cooling, e.g., by quenching, the multilayer melt to form a multilayer sheet. The multilayer sheet is then stretched in the machine direction (MD) over a series of heated rollers traveling at a differential speed to form an MD oriented multilayer film. The stretching of the MD oriented multilayer film takes place in a heated tenter frame to form a biaxially oriented multilayer film. Surface treating is then performed on the first skin layer B and/or the second skin layer D of the biaxially oriented multilayer film with a treatment selected from the group consisting of corona treatment, flame treatment and plasma treatment. Then the first skin layer B is metallized in a vacuum metallizer to form the desired metallized biaxially oriented multilayer film.

EXAMPLES

The following specific examples demonstrate particular aspects of the present invention. Unless indicated to be on some other basis, all parts and percentages are by weight.

Base films for metallizing were produced which contained HCPP core resins. HCPP core resins included Amoco 9218 available from BP Amoco Chemical Co. and Montell Adstiff® 699, obtained from Montell Chemical Co. Control PP core resins consisted of Fina 3371, available from Atofina Chemical Co. and Montell PH384 obtained from Montell Chemical Co. Variations were also produced with synthetic hydrocarbon based resin modifier (Exxon OPPERA PP6114E2, obtained from ExxonMobil Chemical Co.) added into the HCPP core at a loading of 3%. In addition, variables were produced with various core blends of HCPP (Adstiff® 699) and standard PP homopolymer (PH384 obtained from Montell Chemical Co.). These blend variables were produced with the following ratios of PH384 to Adstiff 699 in the core layer: 100/0, 35/65, and 0/100. The films utilized a flame treated HDPE skin layer (Exxon HD6704.67, available from ExxonMobil Chemical Co.) for metallizing and an untreated ethylene propylene butene-1 terpolymer skin (Montell EP-5, obtained from Montell Chemical Co. or Chisso XPM7880, obtained from Chisso Corporation) for sealability. All the base films for metallization were vacuum metallized to an optical density target of 2.4. Metallized rolls were then slit to 15" wide for extrusion lamination trials on a Chesnut press/laminator obtained from Chesnut Corporation. A summary of the resin properties of these HCPP and PP homopolymer core resins is given in TABLE 1 below.

TABLE 1

| Resin Property | Montell PH384 | Montell Adstiff 699 | Fina 3371 | Amoco 9218 |
| --- | --- | --- | --- | --- |
| Melt flow index | 3.0 | 3.5 | 2.8 | 2.0 |
| Xylene solubles % | 4.5 | 1.4 | 3.8 | 1.1 |
| T-star (° C.) | 162.8 | 168.8 | 161.5 | 170.0 |
| T-melting (° C.) | 158.3 | 165.6 | 162.0 | 166.0 |
| Ethylene % | 0 | 0 | 0 | 0 |

The measurement of the dynamic viscoelasticity was conducted by using a Viscoelasiticity Measuring Apparatus [RSAII] produced by Rheometrics Scientific Co., at a vibration frequency of 1 Hz.
T* shown in Table 1 is the temperature at which the differential coefficient of E' in the main dispersion area of the temperature dependent storage modulus E' in the measurement of the dynamic viscoelasticity is $4.1 \times 10^7$ Pa./deg. C.

The extrusion lamination structure produced on the Chesnut to test for metal craze resistance was as follows: 75LBW/7.0–7.5 #/ream LDPE/Metallized Film Variable.

The 75LBW (ExxonMobil Films OPP slip films) was run off the secondary unwind and the metallized film variable was run off the primary unwind. This was done to simulate the more severe condition for metal crazing when the metallized film variable is run off the primary unwind. The LDPE used was Chevron 1017 obtained from Chevron-Texaco Chemical Co.

Other extrusion laminating conditions used were as follows: line speed=270 fpm, poly melt temperature=615° F., air gap=6.75–7.0", die position=2⅜" on nip side, chill roll temperature=70° F., screw rpms=70. Primary web tension was the other variable tested at 3 levels (4 lbs., 12 lbs., 24 lbs.). These tensions translate to pounds per linear inch of web width of 0.27, 0.80, and 1.60. Higher web tensions are more severe for metal crazing. Melt temperature was between 609° and 617° F. A slab sample was produced of each lamination variable. For each lamination variable, visual inspection for metal crazing was conducted and qualified. Metal crazing resulted in a decrease in optical density due to cracks in the aluminum layer that are easily visible when the lamination is backed by fluorescent light.

A summary of the metal crazing results as a function of metallized film core composition and primary unwind web tension is shown below in Table 2. The samples with the PH384 and the 3371 core resins served as the controls for comparison to the variables containing the HCPP core resin. These data indicate that the metal craze resistance is improved relative to the controls when HCPP, and certain blends of HCPP/PP homopolymer are used in the core of the metallized film. The variable with HCPP and resin modifier in the core also exhibited improved metal craze resistance relative to the controls. For blends of HCPP/PP homopolymer in the core layer, the metal craze resistance shows some improvement at HCPP core loadings of 50% and higher relative to the control films. More particularly, the improvement in metal craze is substantial at HCPP core loading of 65% and higher relative to the control films.

TABLE 2

| Extrusion Lam. # | Metallized Film Core Composition | Metal Crazing 4 lbs tension | Metal Crazing 12 lbs tension | Metal Crazing 24 lbs tension |
|---|---|---|---|---|
| EL-11299-06, 07, 08 | 100% PH384 (18XM388 control) | Yes-⅓ of web | Yes-heavy entire web | Not tested |
| EL-11299-10A, B, C | 50% PH384/50% Adstif | None | Yes-⅔ of web | Yes-heavy entire web |
| EL-11299-10D, E, F | 35% PH384/ 65% Adstif 699 | None | None | Yes-⅓ of web |
| EL-11299-08, 09, 10 | 100% Adstif 699 | None | None | None |
| EL-12139-01, 01A, 01B | 3371 w/RPP (70MET-HB control) | None | Yes-⅔ of web heavy | Yes-100% Very heavy |
| EL-12139-04, 04A-04B | 100% 9218X | None | None | Yes-50% light |
| EL-12139-07, 07A07B | 97% 9218X/ 3% resin modifier | None | None | Only 10% on edge |

What is claimed is:

1. A metallized multilayer film comprising:
   (a) a core layer comprising high crystallinity polypropylene homopolymer with a xylene soluble level of 1.5% or less wherein said high crystallinity polypropylene homopolymer is a product of Ziegler-Natta catalysis;
   (b) a first skin layer adjacent to said core layer wherein said skin layer comprises a thermoplastic selected from the group consisting of high density polyethylene, ethylene vinyl alcohol copolymer, medium density polyethylene, linear low density polyethylene, ethylene-propylene random copolymer, ethylene-propylene-butylene texpolynier, propylene-butylene copolymer, and amorphous polyamide; and
   (c) a metallized layer adjacent to said first skin layer.

2. The metallized multilayer film according to claim 1, wherein the shrinkage of said film in the longitudinal direction and in the transverse direction is greater than 5%.

3. The metallized multilayer film according to claim 1, wherein said metallized layer is from about 1.5 to about 3.0 optical density.

4. The metallized multilayer film according to claim 1, wherein said first skin layer is from about 0.5 micron to about 2.0 micron in thickness.

5. The metallized multilayer film according to claim 1, wherein said core layer is from about 10 micron to about 48 micron in thickness.

6. The metallized multilayer film according to claim 1 wherein the total thickness of the film is from about 12 microni to about 50 microns.

7. The metallized multilayer film according to claim 1 wherein said metallized layer comprises aluminum.

8. The metallized multilayer film according to claim 7, further comprising a tie layer interposed between said first skin layer and said core layer.

9. The metallized multilayer film according to claim 8, wherein said tie layer comprises at least one of a maleic anhydride-modified polypropylene homopolymer and a maleic anhydride-modified polypropylene copolymer.

10. The metallized multilayer film according to claim 1, further comprising a second skin layer adjacent to said core layer and on a side of said core layer opposite said first skin layer, said second skin layer comprising a polyolefin selected from the group consisting of ethylene-propylene random copolymer, ethylene-propylene-butylene terpolymer, propylene-butylene copolymer, and ethylene-propylene impact copolymer.

11. the metallized multilayer film according to claim 10, wherein said second skin layer is from about 0.5 micron to about 8.0 micron in thickness.

12. The metallized multilayer film according to claim 4, wherein said first skin layer exposed to a treatment selected from the group consisting of flame treatment, corona treatment and plasma treatment prior to metallization.

13. The metallized multilayer film according to claim 11, wherein said second skin layer is exposed to a treatment selected from the group consisting of corona treatment, flame treatment and plasma treatment.

14. The metallized multilayer film of claim 1, wherein said core layer includes greater than or equal to 50 wt % of said high crystallinity polypropylene homopolymer.

15. The metallized multilayer film of claim 1, wherein said core layer includes greater than or equal to 65 wt % high crystallinity of said polypropylene homopolymer.

16. The metallized multilayer film of claim 1, wherein said core layer further comprises an additive selected from the group consisting of:
   i) an opacifying agent selected from the group consisting of iron oxide, carbon black, aluminum, $TiO_2$, and talc, said opacifying agent being present in said core layer in an amount ranging from about 1 wt % to about 15 wt %, based on the total weight of the core layer;
   ii) a cavitating agent selected from the group consisting of polybutene terephthalate, nylon, solid glass spheres, hollow glass spheres, metal beads, metal spheres, ceramic spheres, and $CaCO_3$, said cavitating agent being present in said core layer in an amount ranging from about 1 wt % to about 20 wt %, based on the total weight of the core layer, said cavitating agent having a mean particle size in the range of from 0.1 micron to 10 microns; and
   iii) a hydrocarbon resin, said resin being one of petroleum resin, terpene resin, styrene resin, cyclopentadiene resin, saturated alicyclic resin, or combinations thereof, said resin having a number average molecular weight <5000, and a softening point ranging from about 60° C. to about 180° C., said resin being present in said core layer at <10 weight percent.

17. A metallized multilayer film comprising:
   1) a first component comprising:
      (a) a core layer comprising a high crystallinity polypropylene homopolymer with a xylene soluble level of 1.5% or less wherein said high crystallinity polypropylene homoplymer is a product of Ziegler-Natta catalysis;
      (b) a first skin layer adjacent to said core layer wherein said skin layer comprises high density polyethylene;
      (c) a vacuum deposited aluminum layer adjacent to said first skin layer; and
   2) a second component comprising a polymer selected from at least one of low density polyethylene, EVA, EMA and EAA that is extrusion laminated to said aluminum layer of said first component at a web tension sufficient to prevent metal crazing of said vacuum deposited aluminum layer.

18. The metallized multilayer film according to claim 17, wherein the shrinkage of said film in the longitudinal direction and in the transverse direction is greater than 5%.

19. The metallized multilayer film according to claim 17, wherein said web tension is up to 1 pound per linear inch on said metallized multilayer film during said extrusion lamination.

20. The metallized multilayer film according to claim 17, further comprising a second skin layer adjacent to said core layer and on a side of said core layer opposite said first skin layer, said second skin layer comprising a polyolefin selected from the group consisting of at least one of ethylene propylene random copolymer, ethylene-propylene-butylene terpolymer, propylene-butylene copolymer, and ethylene-propylene impact copolymer.

21. The metallized multilayer film of claim 17, wherein said core layer includes greater than or equal to 50 wt % of said high crystallinity polypropylene homopolymer.

22. The metallized multilayer film of claim 17, wherein said core layer includes greater than or equal to 65 wt % of said high crystallinity polypropylene homopolymer.

23. The metallized multilayer film of claim 17, wherein said core layer further comprises an additive selected from the group consisting of:
   i) an opacifying agent selected from the group consisting of iron oxide, carbon black, aluminum, $TiO_2$, and talc, said opacifying agent being present in said core layer in an amount ranging from about 1 wt % to about 15 wt %, based on the total weight of the core layer;
   ii) a cavitating agent selected from the group consisting of polybutene terephthalate, nylon, solid glass spheres, hollow glass spheres, metal beads, metal spheres, ceramic spheres, and $CaCO_3$, said cavitating agent being present in said core layer in an amount ranging from about 1 wt % to about 20 wt %, based on the total weight of the core layer, said cavitating agent having a mean particle size in the range of from 0.1 micron to 10 microns; and
   iii) a hydrocarbon resin, said resin being one of petroleum resin, terpene resin, styrene resin, cyclopentadiene resin, saturated alicyclic resin, or combinations thereof, said resin has a number average molecular weight <5000, said resin has a softening point in the range of from about 60° C. to about 180° C., said resin being present in said core layer at <10 weight percent.

24. A metallized multilayer film comprising:
   1) a first component comprising:
      (a) a core layer comprising a high crystallinity polypropylene homopolymer with a xylene soluble level of 1.5% wherein said high crystallinity polypropylene homopolymer is a product of Ziegler-Natta catalysis;
      (b) a first skin layer adjacent to said core layer wherein said skin layer comprises a thermoplastic selected from a group consisting of ethylene vinyl alcohol copolymer, and amorphous polyamide;
      (c) a tie layer positioned between said core layer and said first skin layer comprising maleic anhydride modified polypropylene homopolymer or copolymer;
      d) a vacuum deposited aluminum layer adjacent to said first tie layer, and
   2) a second component comprising a polymer selected from at least one of low density polyethylene, EVA, EMA and EAA that is extrusion laminated to said aluminum layer of said first component at a web tension sufficient to prevent metal crazing of said vacuum deposited aluminum layer.

25. The metallized multilayer film according to claim 24, wherein the shrinkage of said film in the longitudinal direction and in the transverse direction is greater than 5%.

26. The metallized multilayer film according to claim 24, wherein said web-tension is up to 1 pound per linear inch on said metallized multilayer film during extrusion lamination.

27. The metallized multilayer film according to claim 24, further comprising a second skin layer adjacent to amid core layer and on a side of said core layer opposite said first skin layer, said second skin layer comprising a polyolefin selected from the group consisting of ethylene-propylene random copolymer, ethylene-propylene-butylene terpolymer, propylene-butylene copolymer, and ethylene-propylene impact copolymer.

28. The metallized multilayer film of claim 24, wherein said core layer further comprises an additive selected from the group consisting of:
   i) an opacifying agent selected from at least one of $TiO_2$ and talc, said opacifying agent being present in said core layer in the range of from 2–4 weight percent, based on the total weight of the core layer;
   ii) a material selected from at least one of polybutene terephthalate and $CaCo_3$, said material having a mean particle size in the range of from 0.1–10 µm, said material being present in said core layer in the range of from 2–10 weight %, based on the total weight of the core layer; and iii) a hydrocarbon resin, said resin being selected from at least one of petroleum resin, terpene resin, styrene resin, cyclopentadiene resin and saturated alicyclic resin, said resin having a number average molecular weight <5000, and a softening point in the range of from 60° C.–180° C., said resin being present in said core layer at <6 weight percent.

29. A metallized multilayer film comprising:
(a) a yore layer comprising a high crystallinity polypropylene homopolymer with an a xylene soluble level of 1.5% or less wherein said high crystallinity polypropylene homopolymer is a product of Ziegler-Natta catalysis;
(b) a first skin layer adjacent to said core layer wherein said skin layer comprises a thermoplastic selected from a group consisting of ethylene vinyl alcohol copolymer, and amorphous polyamide;
(c) a tie layer adjacent to said first skin layer comprising maleic anhydride modified polypropylene homopolymer or copolymer;
(d) a vacuum deposited aluminum layer adjacent to said first tie layer; and
(e) a second skin layer adjacent to said core layer and on a side of said core layer opposite said first skin layer, said second skin layer comprising a polyolefin selected from the group consisting of ethylene-propylene random copolymer, ethylene-propylene-butylene terpolymer, propylene-butylene copolymer, and ethylene-propylene impact copolymer.

30. The metallized multilayer film according to claim 29, wherein the shrinkage of said film in the longitudinal direction and in the transverse direction is pester than 5%.

31. The metallized multilayer film of claim 29, wherein said core layer includes greater than or equal to 50 wt % of said high crystallinity polypropylene homopolymer.

32. The metallized multilayer film of claim 29, wherein said core layer includes greater then or equal to 65 wt % of said high crystallinity polypropylene homopolymer.

33. The metallized multilayer film of claim 29, wherein said core layer further comprises an additive selected from the group consisting of:
i) an opacifying agent selected from one of $TiO_2$, and talc, or combinations thereof; said opacifying agent present in said core layer in the range of from 2–4 weight percent, based on the total weight of the core layer;
ii) a material selected from one of polybutene terephthalate, $CaCO_3$ or combinations thereof, said material having a mean particle size in the range of from 0.1–10 $\mu$m, said material being present in said core layer in the range of from 2–10 weight %, based on the total weight of the core layer; and
iii) a hydrocarbon resin, said resin being selected from at least one of petroleum resin, terpene resin, styrene resin, cyclopentadiene resin and saturated alicyclic resin, said resin having a number average molecular weight <5000, and a softening point ranging from about 60° C. to about 180° C., said resin being present in said core layer at <6 weight percent.

34. A method of making a metallized biaxially oriented multilayer film comprising the steps of: (a) coextruding a multilayer melt of thermoplastic polymers including a core layer comprising a high crystallinity polypropylene homopolymer with a xylene soluble level of 1.5% or less wherein said high crystallinity polypropylene homopolymer is a product of Ziegler-Natta catalysis through a die; (b) cooling said multilayer melt to form a multilayer sheet; (c) stretching said multilayer sheet in the machine direction (MD) over a series of heated rollers traveling at a differential speed to form an MD oriented multilayer film; (d) stretching said MD oriented multilayer film in a heated tinter frame to form a biaxially oriented multilayer film; (e) surface treating at least one of said first skin layer and said second skin layer of said biaxially oriented multilayer film with a treatment selected from the group consisting of corona treatment, flame treatment and plasma treatment; and (f) metallizing said first akin layer in a vacuum metallizer with aluminum to form a metallized biaxially oriented multilayer film.

35. The method according to claim 34, wherein the shrinkage of said film in the longitudinal direction and in the transverse direction is greater than 5%.

36. The method of claim 34, which further comprises an additional step of extrusion laminating at least one of low density polyethylene, EMA, EVA, and EAA to the metallized side of said film at a web tension sufficient to prevent metal crazing of the vacuum metallized aluminum layer.

* * * * *